(12) United States Patent
Mangerson

(10) Patent No.: US 6,571,483 B1
(45) Date of Patent: Jun. 3, 2003

(54) ORIENTATION SENSOR

(75) Inventor: Mark M. Mangerson, LeMars, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/550,397

(22) Filed: Apr. 14, 2000

(51) Int. Cl.$^7$ ............................................. G01C 15/10
(52) U.S. Cl. ................. 33/366.15; 33/366.24; 33/366.25; 33/366.26
(58) Field of Search .................... 33/366.11, 366.24, 33/391, 366.25, 366.26, 365, 366.16, 366.17, 366.18, 366.19, 390

(56) References Cited

U.S. PATENT DOCUMENTS

| | | | | |
|---|---|---|---|---|
| 1,409,537 A | * | 3/1922 | Franzen ........................ 33/390 |
| 4,085,515 A | * | 4/1978 | Darden ......................... 33/390 |
| 4,493,155 A | * | 1/1985 | Comeau et al. ........... 33/366.26 |
| 4,587,741 A | * | 5/1986 | Rorden et al. ............ 33/366.12 |
| 4,672,753 A | * | 6/1987 | Kent et al. ................. 33/366.21 |
| 5,079,847 A | * | 1/1992 | Swartz et al. ............. 33/366.12 |
| 5,159,761 A | * | 11/1992 | Cagan et al. .............. 33/366.14 |
| 5,365,671 A | | 11/1994 | Yaniger ......................... 33/366 |
| 5,394,029 A | | 2/1995 | Gay et al. .................... 327/511 |
| 5,517,430 A | | 5/1996 | Lewis .......................... 364/559 |
| 5,526,022 A | | 6/1996 | Donahue et al. ............. 345/156 |
| 5,701,900 A | | 12/1997 | Shehada et al. ........ 128/662.03 |
| 5,726,359 A | | 3/1998 | Zeller et al. .............. 73/514.33 |
| 5,794,355 A | | 8/1998 | Nickum ......................... 33/366 |
| 5,814,985 A | | 9/1998 | Oudet ...................... 324/207.2 |
| 5,821,744 A | | 10/1998 | Shinjo et al. ............. 324/207.2 |
| 5,831,164 A | | 11/1998 | Reddi et al. .............. 73/514.01 |
| 5,880,586 A | | 3/1999 | Dukart et al. ............ 324/207.2 |
| 5,953,683 A | | 9/1999 | Hansen et al. ................. 702/95 |
| 5,982,171 A | | 11/1999 | Umemoto et al. ..... 324/207.21 |
| 5,982,178 A | | 11/1999 | Pant et al. ................... 324/252 |
| 6,198,396 B1 | * | 3/2001 | Frank ....................... 340/573.1 |
| 6,247,239 B1 | * | 6/2001 | Shijo et al. ............... 33/366.11 |
| 6,281,456 B1 | * | 8/2001 | Ogden ...................... 33/366.11 |

* cited by examiner

*Primary Examiner*—Diego Gutierrez
*Assistant Examiner*—Yaritza Guadalupe
(74) *Attorney, Agent, or Firm*—Scott Charles Richardson; Rodney L. Lacy; Schwegman, Lundberg, Woessner & Kluth

(57) ABSTRACT

An orientation sensor includes variable resistance elements within the sensor, the variable resistance elements forming an electric circuit with a conductive ball or drop of conductive material. The resistance of the electric circuit uniquely identifies the orientation of the apparatus. A method of determining the orientation of an apparatus includes measuring the resistance of a circuit completed between two conductive members in the apparatus, and determining the position of a freely movable conductive member in the apparatus from the measured resistance.

16 Claims, 3 Drawing Sheets

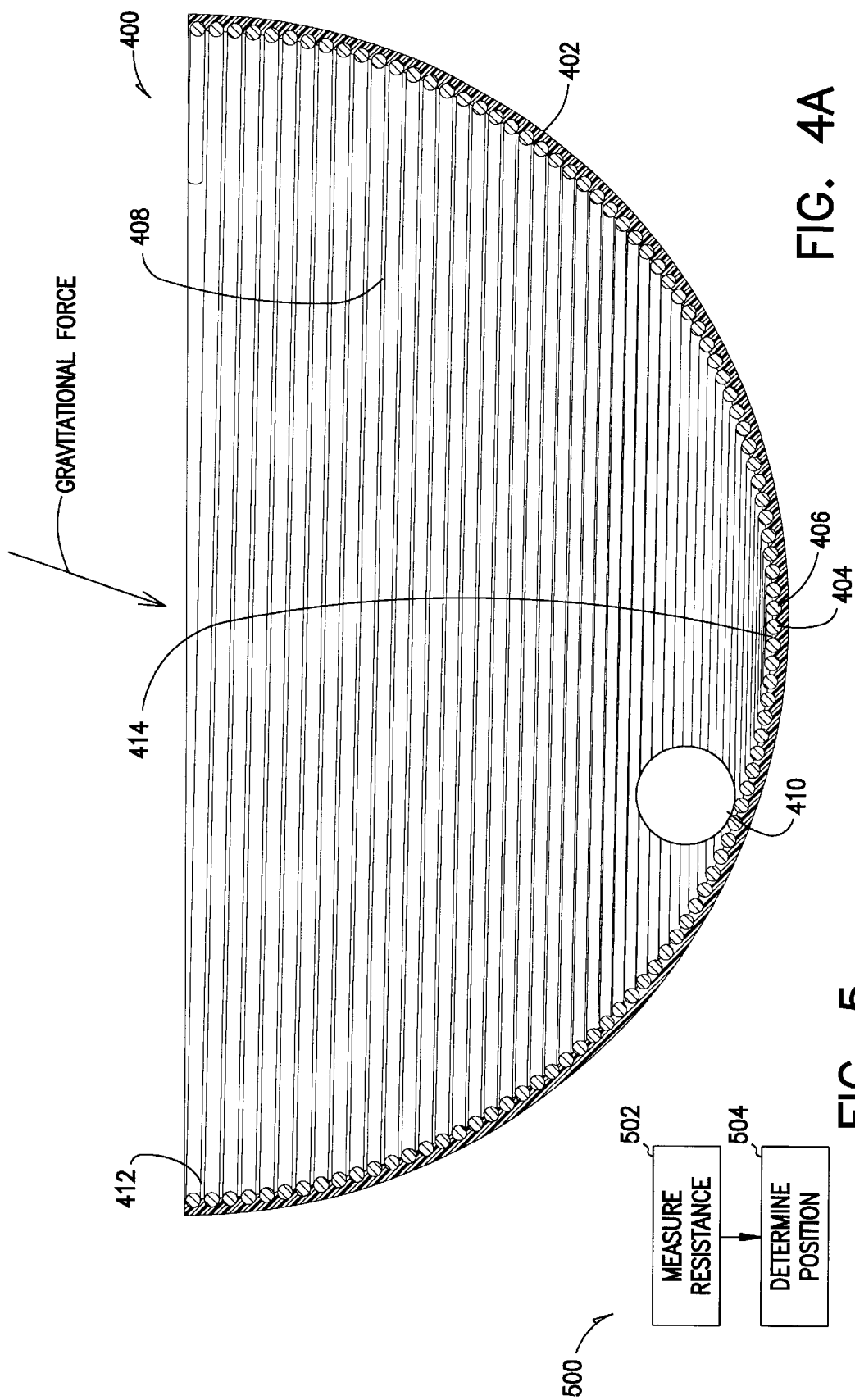

ORIENTATION SENSOR

FIELD

The present invention relates generally to orientation sensors, and more specifically to gravity-based orientation sensors.

BACKGROUND

Orientation sensors are used in many applications. When orientation in two or three dimensions is required by an apparatus, orientation sensors are used. For example, computer peripheral equipment with non-traditional use parameters, including virtual reality apparatuses, wireless mice, non-pad using mice, and the like may all have and use orientation sensors.

Currently, there are many orientation sensors that are truly no more than level sensors. Often, such sensors use an air bubble in some sort of fluid to determine whether an object is level with respect to gravity. One example of such a sensor is a level or carpenter level. A carpenter level indicates only whether the object on which it is placed is level, but does not indicate the angle of inclination. Further, a carpenter level only indicates level with respect to one degree of freedom.

Various apparatuses having chambers and movable drops of mercury have been employed to determine orientation. Such apparatuses, for example that shown in U.S. Pat. No. 5,701,900, include two intersecting toroidal chambers orthogonal disposed, the chambers used to determine orientation of the apparatus. In a first embodiment, discrete electrodes are used to determine the position of the drop of mercury. In a second embodiment, reflective properties of the drop of mercury are used to determine position of the drop within a chamber. The second embodiment requires a light transmissive chamber and a source of light. The first embodiment is subject to error since the discrete electrodes only allow for discrete position determination within the chamber.

Therefore, there is a need in the art for an orientation sensor having multiple degrees of freedom, and also having a less discrete measurement parameter.

SUMMARY

The present invention overcomes the problems of the prior art by providing an orientation sensor which provides orientation information in a gravimetric apparatus. In one embodiment, a freely movable drop of a conductive fluid moves gravimetrically within a chamber, bridging a gap between a first conductive ring and a second variable resistance member. The conductive fluid completes a circuit of a specific resistance, the specific resistance uniquely identifying the position of the conductive fluid in the chamber.

In one embodiment, the chamber measures changes in orientation in a single degree of freedom. In another embodiment, the variable resistance member extends in more than one direction so that the position of the conductive fluid in the chamber has more than one degree of freedom. In still another embodiment, the outer conductive member is a sphere, and traces are run along the inner surface of the sphere, the traces being separated by substantially the same distance for their entire length. The traces are routed along the interior of the sphere, substantially covering the entire interior surface of the sphere. A conductive ball or member, such as a metal bearing or the like, is free to move about the interior of the sphere. The bearing will come to rest covering two traces, creating a circuit therebetween. The resistance of this circuit will uniquely identify the position of the bearing within the sphere, allowing for full three-dimensional orientation sensing of the orientation of the sphere.

A method embodiment for determining the orientation of an apparatus embodiment of the present invention includes determining the position of a freely movable conductive member in an object, measuring the resistance between two contacts bridged by the conductive member, comparing the measured resistance to known resistance tables, and determining the orientation of the object from the position of the conductive member.

Other embodiments are described and claimed.

BRIEF DESCRIPTION OF DRAWINGS

FIG. 4A is a section view of the embodiment of FIG. 4 taken along lines 4A—4A; and FIG. 5 is a flow chart diagram of a method embodiment of the present invention.

DETAILED DESCRIPTION

In the following detailed description of embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and logical, structural, electrical, and other changes may be made without departing from the scope of the present invention.

Figure 1:
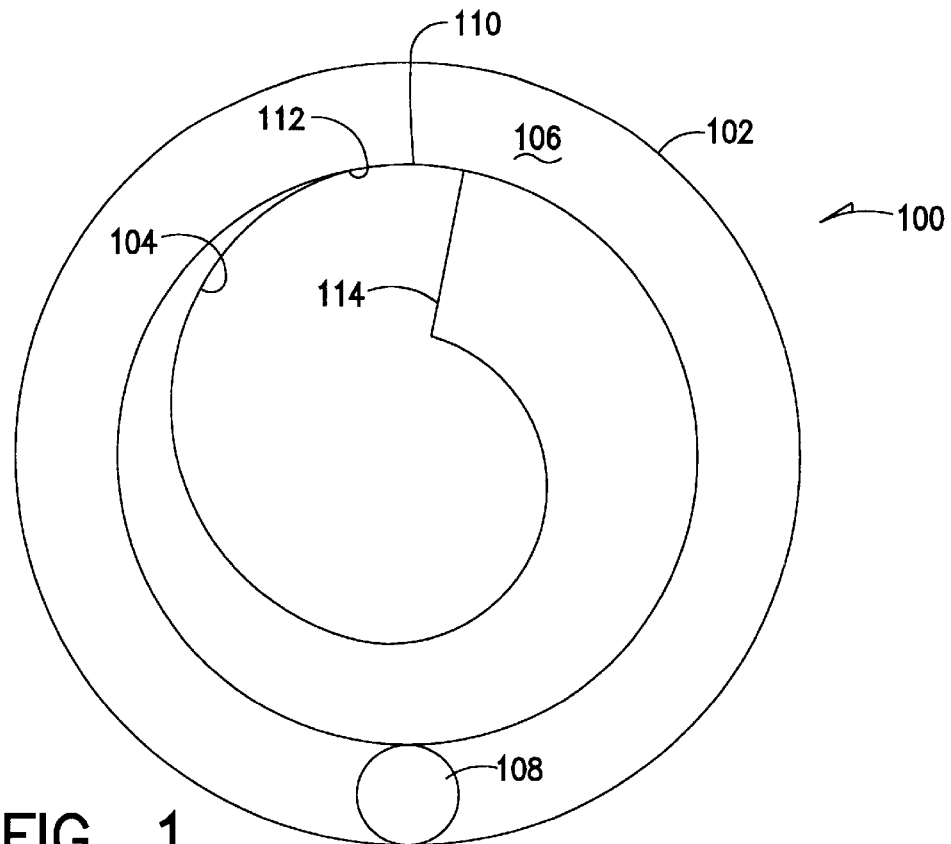
FIG. 1 is an elevation view of an embodiment of the present invention.

FIG. 1 shows one embodiment 100 of an apparatus to measure orientation. Apparatus 100 comprises an outer conductive ring 102 and an inner conductive member 104, defining therebetween a chamber 106. In one embodiment, outer ring 102 is not conductive, but has on its inner surface a conductive coating or the like. The conductors 102 and 104 are each connected to a circuit for measuring resistance. A freely movable conductive cohesive fluid 108, in one embodiment a drop of mercury, is situated in the chamber 106. Drop 108 is of sufficient size to contact both the inner and outer conductors 104 and 102, respectively. The drop 108 will be compelled by gravity to the lowest part of the chamber 106. There, it will bridge the gap between outer ring 102 and inner conductive member 104 to complete a circuit.

The circuit exhibits a unique resistance due to the construction of the inner and outer conductors. In one embodiment, the inner conductive member 104 has a varying resistance around its circumference. That is, each point of the inner conductive member 104 has a unique resistance. When this unique resistance is placed in a circuit completed by the drop 108, the specific orientation of the apparatus 100 is easily determined. In one embodiment, the varying resistance is embodied by an inner conductive member with an increasing number of windings as the variable resistance increases. This potentiometer winding variable resistance inner conductive member allows precise location of the drop 108. As will be appriceiated by those of skill in the art, without departing from the scope of the invention, alternative embodiments may be fashioned that employ instead an outer conductuve member with variable resistance along its circumference and an inner conductive member with near constant resistance along its circumference.

In one embodiment, the inner conductive member 104 has a gap 110 which is non-conductive. The gap 110 has a width larger than the diameter of the drop 108. The gap 110 in this embodiment allows the inner conductive member to have variable resistance as described above, but not short together the ends 112 and 114 of the inner conductive member 104. In one embodiment, the gap 110 is positioned approximately 180 degrees around the rings from the normal orientation of the apparatus 100, although the invention is not so limited.

Gravity forces the drop 108 to the lowest point in the chamber 106, so that a change in orientation of the apparatus 100 results in a change in position of the drop 108. FIG. 1 illustrates the apparatus 100 in a normal operating position. In this position, the original or normal orientation of the apparatus 100 is known. When the apparatus 100 is moved from its original orientation, that is it is tilted from its original position as shown in FIG. 2, the drop 108 is forced by gravity to the new lowest part of the chamber 106.

Figure 2:
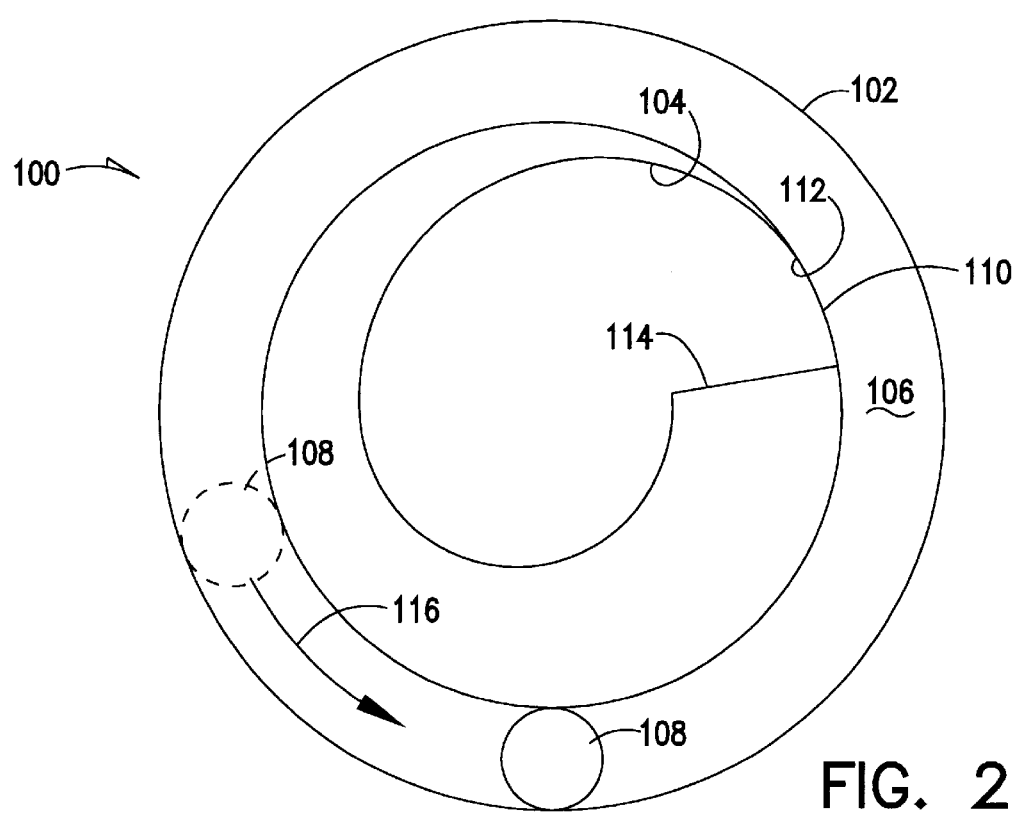
FIG. 2 is an elevation view of the embodiment of FIG. 1 rotated from its initial position.

The original position of drop 108 is shown in broken lines in FIG. 2. The drop 108 moves to its new position as shown by arrow 116. A new resistance reading for the circuit is observed when drop 108 bridges the chamber gap between the outer conductive ring 102 and the inner conductive member 104.

Figure 3:
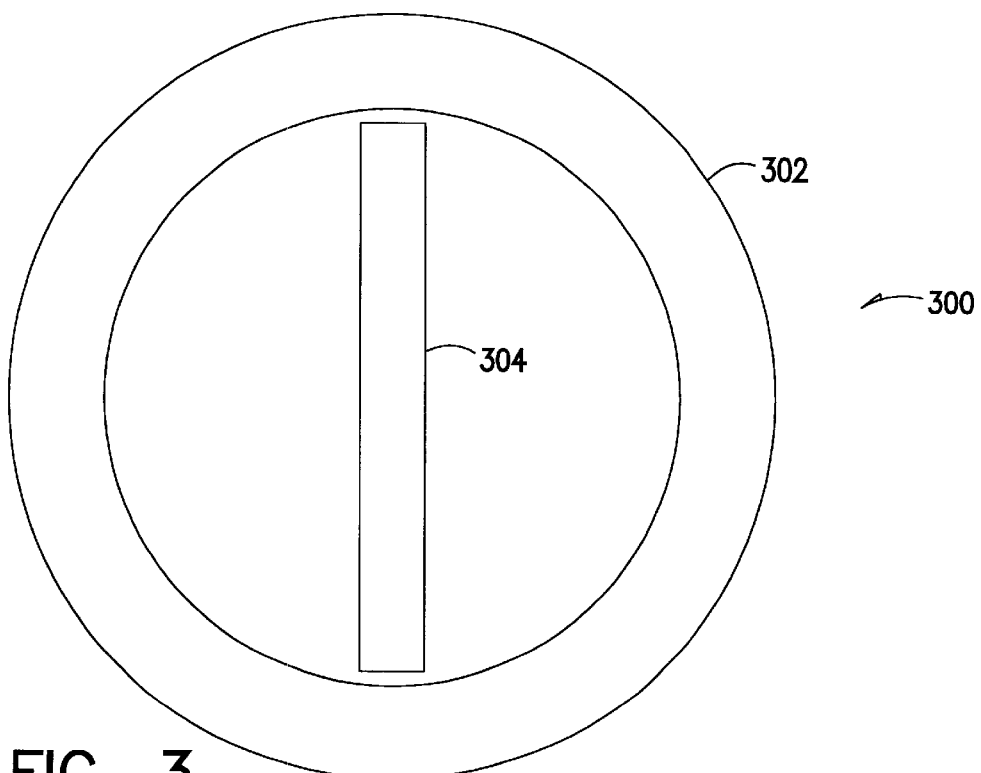
FIG. 3 is an elevation view of another embodiment of the present invention.

Another embodiment of the present invention allows for the measurement of orientation in two degrees of freedom. In this embodiment 300, shown in FIG. 3, two separate sets of rings and conductive inner members 302 and 304 are arranged orthogonal to one another. Each of the sets 302 and 304 are in one embodiment constructed as has been described above with respect to FIG. 1. By determining the unique rotational or orientation resistances of two separate sets of rings, two degrees of freedom are measured. It should be understood that further degrees of freedom may be introduced by adding additional chambers.

Figure 4:
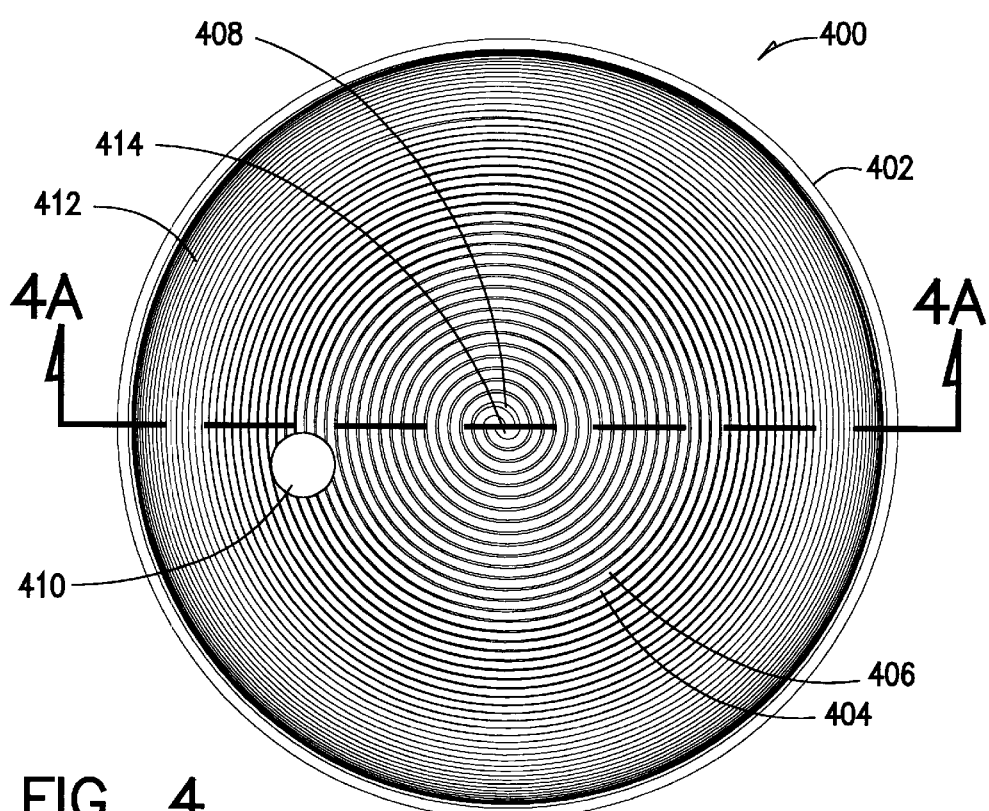
FIG. 4 is a cutaway top view of another embodiment of the present invention.

Yet another embodiment 400 of the present invention is shown in cutaway top view in FIG. 4. Apparatus 400 measures orientation in a full three-dimensional manner. Apparatus 400 comprises a sphere 402 having a pair of conductive members 404 and 406 arranged along the inner surface 408 of the sphere 402. In one embodiment, the conductive members 404 and 406 are separated from each other by a constant distance. The members 404 and 406 are arrayed over the inner surface of the sphere 402 so as to cover substantially the entire inner surface as is shown in FIG. 4. The members therefore alternate between member 404 and member 406 along the inner surface 408 of the sphere 402. A conductive ball 410, in one embodiment a bearing or the like, is free to move unencumbered through the inner chamber 412 of the sphere 402. Gravity dictates that the bearing 410 will come to rest at the lowest point of the chamber 412 no matter what the orientation of the sphere 402.

The bearing or ball 410 is sized so that it will contact two adjacent conductors, and only two adjacent conductors. The contact will complete a circuit between the two conductors, and generate a unique resistance from which the unique position of the bearing or ball 410 is determined. Once the position of the bearing or ball 410 is determined, the orientation of the sphere with respect to a first or known position is determined, and the new orientation of the sphere is known.

As shown in FIG. 4, the sphere 402 is initially in a position in which the bearing or ball 410 is positioned at the bottom 414 of the sphere 402 where the conductive members 404 and 406 begin. Although the normal or original position of the sphere 402 is shown having the conductive members 404 and 406 begin at the bottom 414 if the sphere, it should be understood that any known initial orientation of the sphere allows for calibration and calculation of a new position as an incremental change from the original position.

Since the conductive members 404 and 406 alternate, the bearing or ball 410 does not contact the same member in any sphere orientation. Therefore, the members are not shorted, and resistance measurements made uniquely identify the position of the bearing or ball 410 in the sphere.

FIG. 4A is section elevation view of the embodiment of FIG. 4. As is seen in FIG. 4A, the conductive members 404 and 406 are arrayed along the interior surface 408 of the spherical member 402.

In operation, the embodiments of the present invention function similarly. Each of the conducting members is connected electrically to a circuit to measure resistance. The resistance measured when a circuit is completed by a drop such as drop 108 or a bearing or ball such as bearing or ball 410 identifies the location of the drop, bearing or ball in the chamber or apparatus. The position is uniquely identified because each circuit completed by the drop, bearing or ball has its own resistance. The resistance of the circuit at each position is in one embodiment measured before the apparatus is placed in use.

In some embodiments, known resistances for orientations are then stored in a table, database or the like. In such embodiments, when a resistance is measured, the measured resistance is compared with the table of known resistances, and the position of the apparatus is then determined. In other embodiments, calibration measurements are used to derive an algorithmic formula for mapping resistance measurements to corresponding orientations. In one embodiment, a mapping module is used to calibrate measured resistances to derive an algorithmic formula for mapping resistance measurements to a corresponding oreintation. In yet other embodiments, a derived algorithmic formula is used in a similar manner to determine expected orientation, corrected by a use of a derived look-up table calibrated to compensate for inconsistencies due to manufacturing tolerances or to wear. When the initial position of the apparatus is known, then the new position determined by the measurement of resistance of the newly formed circuit is translated to a relative difference in position.

A method embodiment 500 for determining orientation in an apparatus such as apparatuses 100, 300 and 400 is shown in FIG. 5. Method 500 comprises measuring the resistance of a completed circuit in an object in block 502, and determining the position of a freely movable conductive member in an object from the measured resistance in block 504. Determining the position of the freely moveable conductive member in one embodiment comprises comparing a known initial position resistance to the measured new resistance, and comparing known resistances for positions within a chamber to the measured new resistance. This determines actual position. From a known initial position, the displacement of orientation is computed. In various embodiments, the displacement if computed for one or two degrees of freedom, or for a full three-dimensional sphere.

The tables of known resistances for known positions in a chamber may be arranged in many ways, as will be seen by those of skill in the art. For example, and not by way of limitation, the tables are in various embodiments written tables, computerized tables of data in database or spreadsheet form, and the like.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. An orientation sensor, comprising:
    a first conductive ring;
    a first conductive member substantially concentric to the first conductive ring, the first conductive member having a variable resistance; and
    a freely movable drop of conductive material contained between the first conductive member and the first conductive ring, the drop contacting each of the first conductive member and the first conductive ring.

2. The orientation sensor of claim 1, wherein the first conductive member has a thickness increasing from a minimum with lowest resistance and a maximum with highest resistance.

3. The orientation sensor of claim 1, wherein the first conductive member includes a non-conductive gap.

4. The orientation sensor of claim 3, wherein the non-conductive gap is positioned approximately 180 degrees from the normal orientation position of the freely movable drop.

5. The orientation sensor of claim 1, wherein the drop of conductive material is mercury.

6. The orientation sensor of claim 1, wherein the first conductive member comprises potentiometer windings.

7. The orientation sensor of claim 1, and further comprising:
    a resistance measurement circuit electrically connected to the first conductive member and to the first conductive ring to measure resistance of a completed circuit between the first conductive member and the first conductive ring.

8. The orientation sensor of claim 7, and further comprising:
    a lookup table of known resistances for circuits completed between the first conductive member and the first conductive ring.

9. The orientation sensor of claim 7, and further comprising:
    a mapping module to calibrate measured resistances to derive an algorithmic formula for mapping resistance measurements to a corresponding oreintation.

10. The orientation sensor of claim 1, and further comprising:
    a second conductive ring;
    a second conductive member having a variable resistance; and
    a second freely movable drop of conductive material contained between the second conductive member and the second conductive ring, the second drop contacting each of the second conductive member and the second conductive ring.

11. The orientation sensor of claim 10, wherein the second conductive ring and second conductive member are positioned orthogonal to the first conductive ring and the first conductive member.

12. The orientation sensor of claim 1, wherein the first conductive ring is an inner ring, and the first conductive member is an outer member.

13. The orientation sensor of claim 1, wherein the first conductive ring is an outer ring, and the first conductive member is an inner member.

14. An orientation sensor, comprising:
    a spherical outer member;
    a first degree of freedom member, comprising:
        a first conductive ring;
        a first conductive ring member having a variable resistance; and
        a first freely movable drop of conductive material contained between the first ring and the first conductive member; and
    a second degree of freedom member comprising:
        a second conductive ring;
        a second ring conductive member having a variable resistance; and
        a second freely movable drop of conductive material contained between the second ring and the second conductive member.

15. The orientation sensor of claim 14, wherein each of the conductive members comprises a member having a thickness increasing from a minimum with lowest resistance and a maximum with highest resistance.

16. The orientation sensor of claim 14, wherein each conductive member includes a non-conductive gap.

* * * * *